Jan. 10, 1961 F. S. NURY ET AL 2,967,614
SORTING RAISINS BY OPTICAL DIFFERENCE
Filed June 30, 1959 2 Sheets-Sheet 1
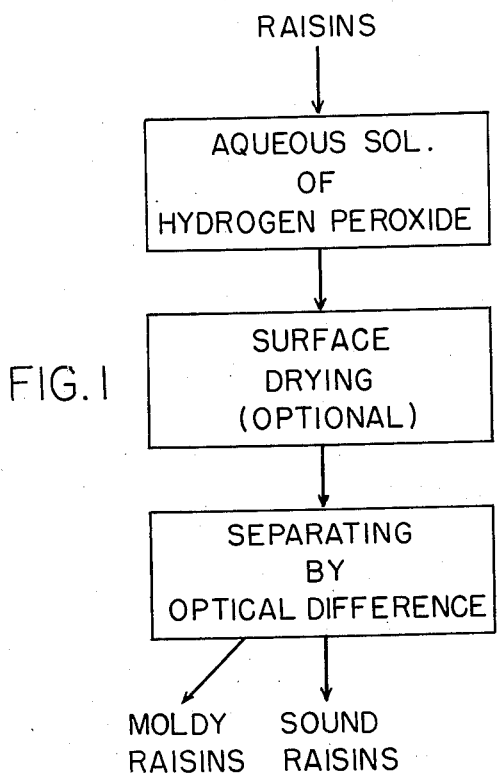
FIG. 1
FIG. 2
FIG. 3
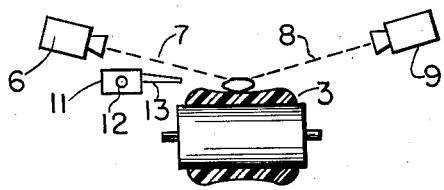
FIG. 6
F. S. NURY &
W. F. TALBURT
INVENTORS
BY
ATTORNEY

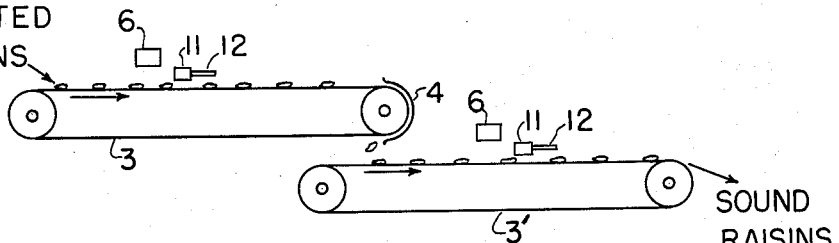
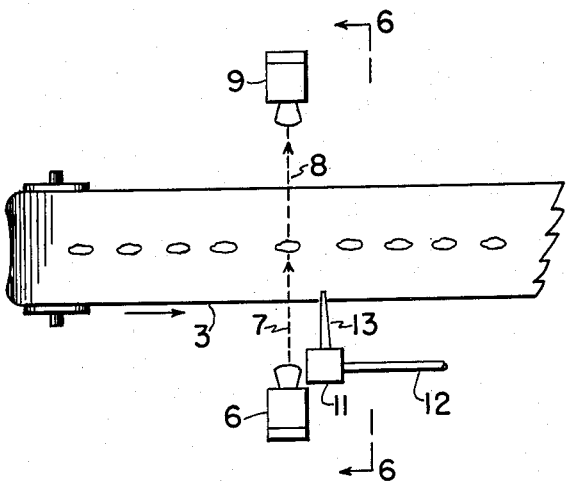
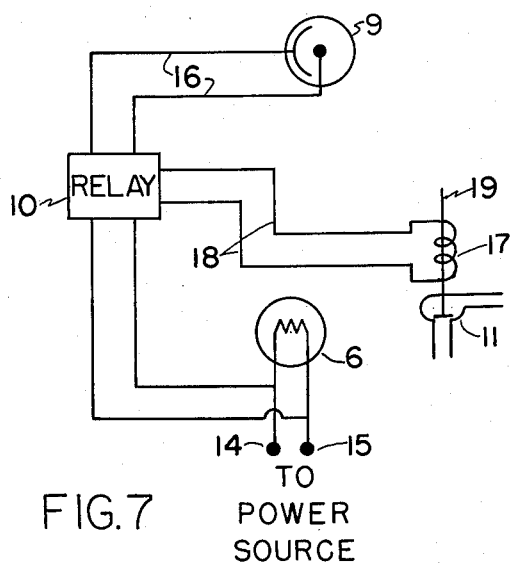

United States Patent Office 2,967,614
Patented Jan. 10, 1961

2,967,614
SORTING RAISINS BY OPTICAL DIFFERENCE

Fredoon S. Nury, Oakland, and William F. Talburt, Berkeley, Calif., assignors to the United States of America as represented by the Secretary of Agriculture Filed June 30, 1959, Ser. No. 824,164

4 Claims. (Cl. 209—2)

A non-exclusive, irrevocable, royalty-free license in the invention herein described, throughout the world for all purposes of the United States Government, with the power to grant sublicenses for such purposes, is hereby granted to the Government of the United States of America.

This invention relates to methods of sorting raisins. A particular object of the invention is the provision of processes for separating moldy from sound raisins. Further objects and advantages of the invention will be evident from the following description taken in connection with the annexed drawing wherein like numerals indicate like parts.

In the drawing:

Fig. 1 is a schematic flow sheet of the process of the invention.

Figs. 2 and 3 illustrate, respectively, a sound raisin and a moldy one after treatment with peroxide.

Figs. 4 to 7 illustrate apparatus which may be employed to carry out the process of the invention. Fig. 4 depicts a side view of the apparatus. Fig. 5 is a plan view of part of the apparatus, on an enlarged scale. Fig. 6 is a cross-section taken on plane 6—6 of Fig. 5. Fig. 7 is a circuit diagram of components of the system.

In the production of raisins, it is conventional to remove the bunches of grapes from the vines and lay them out in the field where they are exposed to the sun. The grapes are thus dried by natural means forming the product known as raisins. This natural or sun-drying procedure produces an entirely satisfactory product provided there is no rain during the drying period. If it rains, mold develops on the raisins, particularly those which were in such positions that moisture could not evaporate readily. The product thus will contain sound raisins plus moldy raisins. Such a product commands a greatly reduced price as compared to a product containing only sound, mold-free raisins. In general, where the raisins contain a substantial proportion of moldy fruit (over about 4%) the product cannot be sold on the regular market but must be diverted to use for preparing spirits. Sale for such use brings only a fraction of the regular price.

This problem has confronted the industry for a long time and various techniques have been advocated for sorting the raisins to segregate the moldy from the sound fruit. However, prior methods have not proved feasible as yielding ineffective sorting or as involving prohibitive costs.

The problem of sorting raisins is particularly difficult because the moldy and sound fruit exhibit at most very minor differences. Thus the moldy fruit retains the size, shape, color, taste, density, and texture of the sound fruit. In appearance there is this distinction that the moldy fruit has small deposits of mold on the surface. However casual examination may result in confusing such mold colonies with normal sugar deposits. Generally, close examination of the fruit is required for accurate detection of moldy area, particularly where they are small.

The process of the invention offers a relatively inexpensive, yet effective method of separating moldy from sound raisins despite the fact that the two types of fruit exhibit such slight outward differences. The process of the invention is best explained by reference to the annexed drawing.

Referring now to Fig. 1, the first step in the process involves treating the raisins to be sorted with an aqueous solution of hydrogen peroxide. To this end, the raisins in the form of individual fruit, that is, de-clustered and preferably free from stems and other debris, are fed into a tank containing an aqueous solution of hydrogen peroxide. The raisins are immersed in this solution until the moldy fruit develops spongy formations in areas where there is mold growth. In this treatment the sound fruit retains its normal appearance and properties.

Next the peroxide-treated raisins are subjected to a current of air, heated or at normal temperature, to blow off excess solution and effect a superficial (surface) drying. In the alternative, the raisins may be drained on a sieve or grill. However neither the surface air drying nor draining is essential and are usually omitted.

The peroxide-treated raisins are then subjected to treatment to separate the moldy from the sound raisins. The procedure employed involves a segregation based on the difference in optical properties between the moldy raisins and the sound ones, this difference having been developed by the preceding peroxide treatment. After the separating operation, the moldy and sound fractions may be dried in conventional manner to remove the moisture added during the peroxide treatment. Any hydrogen peroxide remaining in the fruit tissue will decompose spontaneously when the fruit is stored leaving no harmful residue.

As noted above the separation of the peroxide-treated moldy and sound raisins takes advantage of the difference in optical properties exhibited by the two types of raisins. This difference is developed by the peroxide treatment; it is not present in the untreated raisins. Thus if a batch of untreated raisins is examined it will be found that there is no substantial difference in optical properties between the moldy and sound ones. However, the peroxide treatment completely changes this picture. That is, it develops spongy formations in areas where there is mold growth without altering sound tissue. These spongy formations are much lighter in color than the normal tissue. Thus the spongy formations are white to pale tan in contrast with the brown of the normal raisins. This difference in color developed by the peroxide makes it easy to separate the moldy and sound raisins by mere visual examination and manual separation. Although such manual operation can be employed it is obviously preferable to employ power-operated apparatus which essentially duplicates such action. Apparatus for accomplishing such action is depicted in the drawing and explained herein below.

The peculiar effect of the hydrogen peroxide may be explained as follows: When the raisins are contacted with hydrogen peroxide, this compound penetrates through the pellicle or skin into the raisin tissue. In the event that this tissue is in mold-free condition, no changes occur as regards matters of concern to the invention. However, where there is mold growth, the hydrogen peroxide is rapidly decomposed liberating oxygen in accordance with the equation $$2H_2O_2 = 2H_2O + O_2$$

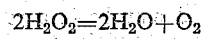

This reaction is catalyzed by the presence of the enzyme catalase which is elaborated by the mold organisms. (Normal raisin tissue is essentially free from this enzyme.) The liberated oxygen is trapped in the tissue in the form of minute globules producing en masse with the surrounding tissue the aforesaid spongy, whitish formation. It is to be particularly noted that the spongy formation is consistently larger in area than would be expected from the original visible size of the mold growth. In typical cases external mold growths covering areas not much bigger than a pinhead will, after peroxide treatment, yield spongy formations having an area on the order of 6 to 50 sq. mm. Since mold growth generally occurs at several points on the raisin surface, the resulting spongy formation will extend over a considerable proportion of the raisin surface. Referring now to the drawing, Fig. 2 depicts a sound raisin after peroxide treatment. As noted above, the fruit is the same in texture, color, and general appearance as the untreated fruit. Fig. 3 depicts a moldy raisin after peroxide treatment. The spongy area 1 is of a whitish color and contrasts with the normal brown of the sound tissue 2.

The peroxide treatment of the raisins involves nothing more than soaking the raisins in an aqueous solution. The concentration of hydrogen peroxide may be varied: for example, about from 2 to 15%, preferably 6 to 10%, by weight of $H_2O_2$. The time required to develop the spongy formations will generally be shorter as the concentration of $H_2O_2$ is increased. For example at a concentration of 7.5%, about 10 minutes soaking is used; at a concentration of 5%, about 13 to 15 minutes of soaking is used. In any particular case one can easily tell when the raisins are ready for further processing by simply lifting them out of the solution and observing them. If the spongy formations are not yet formed, the raisins are allowed to soak a while longer and re-examined. The peroxide solution is ordinarily prepared by mixing a commercial solution of hydrogen peroxide with water to establish the desired concentration. If desired however the peroxide may be produced in situ by dissolving in water sodium peroxide and the calculated amount of a non-toxic acid—such as hydrochloric, sulphuric, phosphoric, etc.—as required by stoichiometry.

Reference is now made to Figs. 4 to 7 which disclose apparatus which may be employed to effect the separation of the peroxide-treated raisins automatically. The device includes a pair of belts 3 and 3' each having a concave surface as particularly evident in Fig. 6. The belts are looped about conventional rolls which are driven to traverse the belts in the indicated direction. The peroxide-treated raisins to be sorted are fed in a single row in spaced relation to one another onto belt 3 at the left end thereof (as viewed in Fig. 4) and are carried by the belt past the sorting mechanism described below. Those raisins which remain on the belt 3 are transferred to belt 3' and carried past a duplicate sorting mechanism associated with belt 3'. Arcuate guide 4 is provided so that as the raisins are transferred from belt 3 to belt 3', they will in general present their opposite faces to belt 3' as compared to their former position on belt 3. The raisins which pass the sorting mechanism associated with belt 3' are discharged at the end of this belt. In the modification described in detail herein, the sound raisins are discharged at the end of belt 3' whereas the moldy raisins are discharged laterally from belts 3 and 3' as the fruit passes the respective sorting mechanisms.

The sorting mechanism associated with each of the belts includes a light source 6 provided to project a light beam 7 onto the belt 3 (or 3'). As the belt traverses, each individual raisin will in turn be impinged by beam 7. The light reflected from the raisins, represented by beam 8, is received on the light-sensitive element of photoelectric cell 9. The light projected by source 6 may be of various types as produced by incandescent filaments, glowing gases or vapors and may be in a restricted wavelength range, for example, ultra-violet or other selected portion of the spectrum.

Individual raisins are segregated in accordance with the response of the light-sensitive element to the light reflected thereon. To accomplish this end photoelectric cell 9 is operative on a quantitative light basis, that is, it is sensitive to the quantity of light thereby completing an electric circuit, as will hereafter be explained, when the quantity of light it receives is dimensioned beyond a predetermined level. In this case the photoelectric cell 9 is set so that it will complete an electric circuit and activate relay 10 only when the light reflected from a moldy raisin impinges upon it. When a sound raisin enters the beam from source 6 and light is reflected from the sound raisin into the cell 9, the amount of light is insufficient to cause the activation of relay 10.

Adjacent to belt 3 is mounted electrically-controlled valve 11 connected to a scource of compressed air by pipe 12. Nozzle 13 is provided to direct an air stream across the belt when valve 11 is opened. In such event the individual raisin in the path of the air stream is propelled transversely off belt 3. The same mechanism and action are involved in connection with belt 3'.

The operative relationship of photoelectric cell 9, relay 10, etc. is shown in the circuit diagram of Fig. 7. Referring to the figure, terminals 14 and 15 are connected to a conventional source of electricity to provide power for operation of light source 6 and relay 10. Photoelectric cell 9 is connected by wires 16 to relay 10 which in turn is connected to coil 17 by wires 18. Valve stem 19 is biased so that normally valve 11 is closed. In the event that a moldy raisin intercepts light beam 7, the reflected light therefrom impinging on cell 9 will activate relay 10. This relay includes conventional electronic components whereby coil 17 is activated for a brief period of time, temporarily lifting valve stem 19. This results in release of a burst of air from nozzle 13 propelling the individual fruit unit in question off the belt. As noted above, when sound raisins intercept the light beam they do not reflect enough light to cause cell 9 to activate relay 10. The net result is that the moldy raisins are blown off the belt whereas the sound ones continue to the end of the belt. The moldy and sound raisins may be received in separate hoppers, bins, or other suitable receiptacles.

Various modifications may be made of the embodiment disclosed in the drawing. For example, circuit parameters may be so chosen that relay 10 is activated by an amount of light less than a predetermined level. In such event the sound raisins will be blown off the belt and the moldy ones will continue on it. Further, it is not essential to employ a blast of air to reject the selected raisins. Thus the air blast equipment can be replaced by any equivalent device as for example a relay-actuated gate which will swing across the belt to divert selected raisins off the belt. Another plan is to provide a relay-actuated mechanical driver adapted to push selected raisins off the belt.

It is evident from the above description that the raisins are subjected to a first sorting on belt 3. The moldy raisins are blown off this belt whereas those which pass by the sorting mechanism are transferred in inverted position to belt 3'. On the latter belt the sorting is repeated, the moldy raisins being blown off and the sound ones continuing on the belt. The duplicate sorting thus applied is desirable to expose different faces of the raisins to the optical system. On each belt the optical system responds only to the characteristics of the upper surfaces of the raisins and by effecting a turning over of the fruit in transferring from one belt to the other one attains an exposure to the second optical system of those faces which were not exposed in the first sorting operation. It is of course evident that this principle may be further extended to provide as many duplicate sorting units as desired to secure any desired degree of sharpness of fractionation. By providing means for re-orienting the position of the raisins before each sorting operation one is assured that every moldy area is exposed to the optical system. Various conventional devices such as guides, rakes, rollers, intermittent tapping devices, etc. may be used instead of the arcuate guide disclosed herein to effect the reorientation. By suitable choice of such equipment one may even reorient the raisins on a single belt or other suitable conveying apparatus.

It is evident that in conducting the selection, the raisins need not necessarily be conveyed on a belt. For example the selection may be effected while the raisins are falling freely or sliding down an inclined plane. The raisins may be conveyed by chain conveyors or by conveyors having individual cups for holding single raisins. Further extensions of the principles of the invention will be obvious to those skilled in the art.

Having thus described our invention, we claim:

1. A process of separating moldy raisins from a lot of raisins containing moldy raisins and sound raisins which comprises immersing the lot of raisins in an aqueous solution of hydrogen peroxide until the moldy raisins develop sponginess, removing the raisins from the solution, and segregating the moldy and sound raisins by means selectively responsive to the difference in optical properties of the moldy and sound raisins.

2. A process of separating moldy raisins from a lot of raisins containing moldy raisins and sound raisins which comprises immersing the lot of raisins in an aqueous solution of hydrogen peroxide until the moldy raisins develop sponginess, removing the raisins from the solution, impinging light on the raisins, receiving light reflected from the raisins in a light-sensitive element, and segregating individual raisins in accordance with the response of the light-sensitive element to the light reflected thereon.

3. A process of separating moldy raisins from a lot of raisins containing moldy raisins and sound raisins which comprises soaking the lot of raisins in an aqueous solution of hydrogen peroxide until the moldy raisins develop spongy formations in areas of mold growth, removing the raisins from the said solution, serially impinging a beam of light on the raisins, directing light reflected from the raisins at a light-sensitive element, and automatically rejecting individual raisins in accordance with the response of the light-sensitive element to the light reflected thereon.

4. A process of separating moldy raisins from a lot of raisins containing moldy raisins and sound raisins which comprises soaking the lot of raisins in a solution of hydrogen peroxide until the moldy raisins develop spongy formations in areas of mold growth, removing the raisins from the said solution, conveying the raisins in spaced relationship through a zone where the raisins are illuminated, receiving light reflected from the raisins in a light-sensitive element, and automatically rejecting individual raisins in accordance with the selective response of the light-sensitive element to the light reflected thereon by the individual raisins.

References Cited in the file of this patent

UNITED STATES PATENTS

| | | |
|---|---|---|
| 2,190,563 | Horsfield | Feb. 13, 1940 |
| 2,646,880 | Frankel | July 28, 1953 |

OTHER REFERENCES

Agricultural Engineering, February 1955, pages 100–105.